United States Patent [19]

McMurtry et al.

[11] Patent Number: 5,064,290

[45] Date of Patent: Nov. 12, 1991

[54] OPTO-ELECTRONIC SCALE-READING APPARATUS WHEREIN PHASE-SEPARATED SECONDARY ORDERS OF DIFFRACTION ARE GENERATED

[75] Inventors: David R. McMurtry, Wotton-Under-Edge; William F. N. Stephens, Badminton, both of United Kingdom

[73] Assignee: Renishaw plc, Gloucestershire, United Kingdom

[21] Appl. No.: 531,402

[22] Filed: Apr. 12, 1990

Related U.S. Application Data

[63] Continuation-in-part of Ser. No. 382,686, filed as PCT/GB88/01081 Dec. 12, 1988, abandoned.

[30] Foreign Application Priority Data

Dec. 12, 1987 [GB] United Kingdom .................. 8729066
Apr. 15, 1989 [GB] United Kingdom .................. 8908593
Jun. 7, 1989 [GB] United Kingdom .................. 8913039

[51] Int. Cl.$^5$ .............................................. G01B 9/02
[52] U.S. Cl. ................................ 356/356; 250/237 G; 250/231.16
[58] Field of Search ............... 356/356, 359, 363, 400, 356/401; 250/237 G, 231.14, 231.16

[56] References Cited

U.S. PATENT DOCUMENTS

| | | | |
|---|---|---|---|
| 4,091,281 | 5/1978 | Willhelm et al. | 250/237 G |
| 4,222,633 | 9/1980 | Hock . | |
| 4,273,448 | 6/1981 | Schiler | 250/237 G |
| 4,527,056 | 7/1985 | Burkhardt et al. | 250/237 G |
| 4,776,701 | 10/1988 | Pettigrew | 356/356 |
| 4,800,547 | 1/1989 | Kessels et al. | 250/237 G |

FOREIGN PATENT DOCUMENTS

| | | |
|---|---|---|
| 0132978 | 2/1985 | European Pat. Off. . |
| 163362 | 12/1985 | European Pat. Off. . |
| 3810165 | 7/1989 | Fed. Rep. of Germany . |
| 2451994 | 11/1976 | Netherlands . |
| 1504691 | 3/1978 | United Kingdom . |
| 07944 | 12/1987 | World Int. Prop. O. . |

OTHER PUBLICATIONS

"Interference–Generated Moire Fringes in a System of Three Reflection Gratings" Kulindzhi et al., Optical Technology, vol. 38, No. 10, Oct. 1971.

*Primary Examiner*—Samuel Turner
*Attorney, Agent, or Firm*—Spencer & Frank

[57] ABSTRACT

Apparatus for generating a quadrature signal for the purpose of determining the direction in which the scale is being read. There is provided a primary grating means defining spaced lines and adapted for generating orders of diffraction, secondary grating means defining spaced lines arranged at an angle to those of the primary grating means thereby to separate said orders of diffraction into differing phases, and tertiary grating means movable together with the secondary grating means relative to said primary grating means and adapted for detecting the respective said phases and for generating correspondingly phased light modulations which are detected by respective transducers connected to a quadrature-forming circuit.

53 Claims, 6 Drawing Sheets

OPTO-ELECTRONIC SCALE-READING APPARATUS WHEREIN PHASE-SEPARATED SECONDARY ORDERS OF DIFFRACTION ARE GENERATED

BACKGROUND OF THE INVENTION

This application is a continuation-in-part of application Ser. No. 07/382,686, filed as PCT/GB88/01081 Dec. 12, 1988, now abandoned.

This invention relates to opto-electronic scale-reading apparatus and is concerned with generating a quadrature signal for the purpose of determining the direction in which the scale is being read.

A known such apparatus (International Publication No. 86/03833) comprises first grating means defining a scale, a readhead adapted for displacement relative to the scale, second and third grating means provided on the readhead, a light source provided on the readhead for illuminating the first grating means thereby to generate a periodic light pattern, the second grating means inter-acting with the light pattern for generating interference fringes in the plane of the third grating means, said interference fringes having movement relative to said third grating means in accordance with said displacement thereby to generate a corresponding light modulation, said first, second and third grating means each having a periodic structure defined by spaced lines, and phase-separating means for separating said modulation into a plurality of phases for generating a quadrature signal of said modulation.

The known phase-separating means may, for example, be in the form wherein two of said grating means are angularly offset to generate moire fringes constituting said phases of the modulation.

It is a disadvantage of the known apparatus that the different phases are derived from different regions of the scale. Therefore variation in the quality of the scale, e.g. different reflectivities, lead to different qualities in the respective phases and consequently to errors in the quadrature signal.

Attempts have been made to overcome this by generating the different phases from the same scale region as in EP 0 163 362. However, here the light paths concerned in the generation of the different phases emanate from the scale in different directions and may therefore be sensitive to differential contamination of the scale.

The latter difficulty has been addressed in DE 35 41 199 wherein said sensitivity to scale contamination is sought to be avoided by introducing means for producing two sets of phase signals wherein the two sets are in anti-phase and are combined so that differential contamination is avoided. However, the two sets necessarily read two different regions of the scale so that the effect of differential contamination of the regions, or other variation in scale quality, cannot be avoided. Also, DE 35 41 199 is of relatively complex construction.

SUMMARY OF THE INVENTION

The present invention overcomes the above difficulties essentially by the generation of phase-separated secondary orders of diffraction. As a result the light defining the respective phases emanates from a common region of the scale and insofar as light paths emanating from that common region have different directions, it is nevertheless the case that each phase is built up of light from each of those differently directed paths.

BRIEF DESCRIPTION OF THE DRAWING

Examples of apparatus according to this invention will now be described with reference to the accompanying drawings wherein.

DESCRIPTION OF THE PREFERRED EMBODIMENTS

Figure 1:
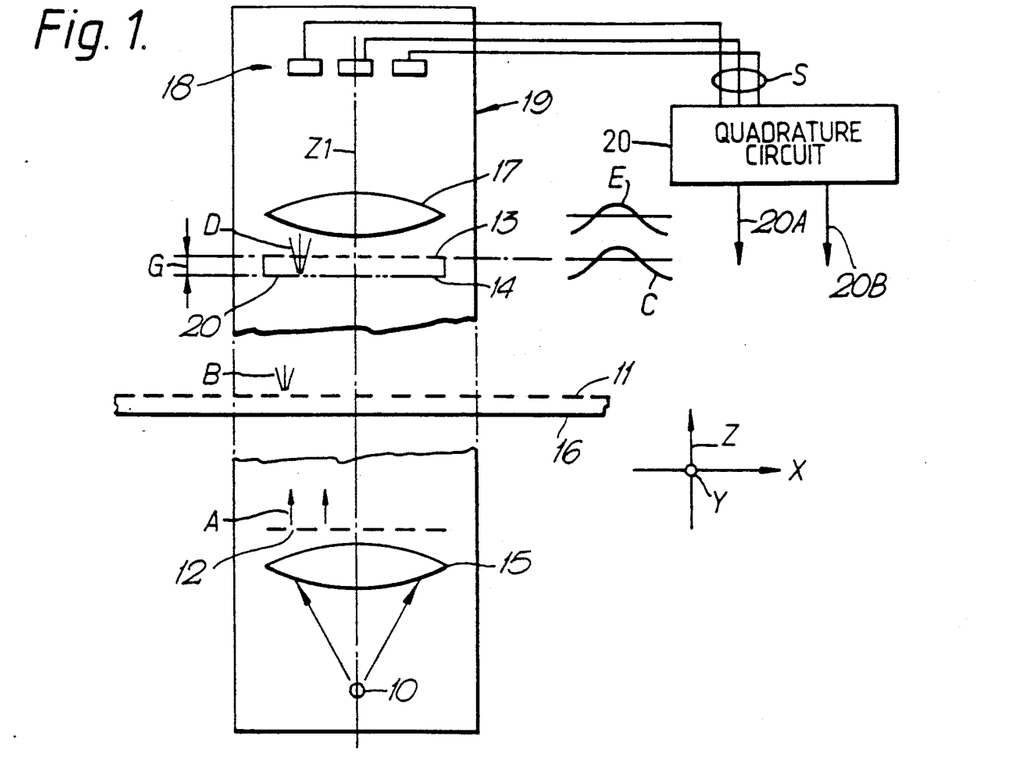
FIG. 1 is an elevation of a first example of the apparatus.
Figure 3:
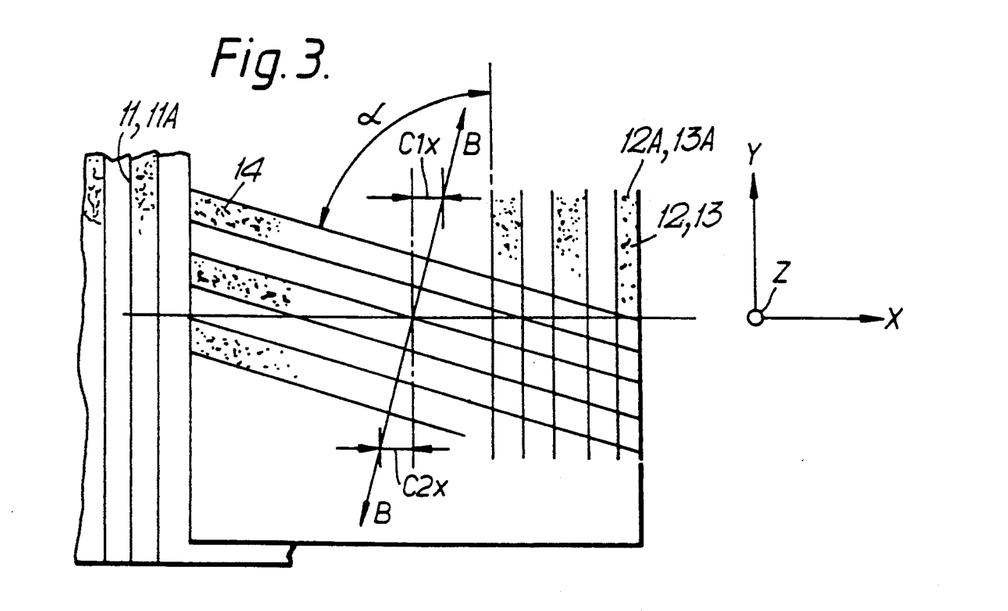
FIG. 3 is a view on the line III—III in FIG. 2.

Referring to FIG. 1, light from a source 10 is collimated by a lens 15 and illuminates a scale defined by a first grating 11 provided on an elongate transparent body 16. Between the lens 15 and the first grating 11 there is arranged a second (or index) grating 12 which divides the collimated light into a periodic light pattern A. The light from the source 10 may be non-coherent. The first grating 11 diffracts the light from the pattern A into primary orders B which generate a set of fringes C at the plane of a third or analyser grating 13. A fourth grating 14 is introduced between the first grating 11 and the third grating 13 at a given distance G from the latter grating. A lens 17 at the far side of the grating 13 focuses the light emerging from the grating 13 onto a system 18 of opto-electronic transducers. The light source 10 and the gratings 12, 13, 14 are embodied in a readhead 19 which is movable relative to the grating 11 in the direction o the length of the body 16. In operation, the movement of the readhead 19 causes the fringes C to move across the grating 13 and give rise to a sinusoidal light modulation E at the far side of the grating 13. Having regard to the three mutually perpendicular directions X, Y, Z, the grating 11, 12, 13, 14 extend in XY planes spaced in the direction Z. The lines, e.g. 13A (FIG. 3) of the grating 11, 12, 13 extend in the direction Y.

The grating 14 is a beam splitter (FIG. 2) which divides each primary order B approaching the grating 13 into a group of secondary orders D. Thus each of three primary orders B0, B1, B2 is divided into a group comprising of three secondary orders D0, D1, D2, so that there are three such groups defining altogether nine secondary orders, each of which has its own unique direction but which are grouped in three phases P0, P1, P2. Accordingly, the fringes C occur in three phases C0, C1, C2, and the modulations E occur in three phases E0, E1, E2.

Figure 2:
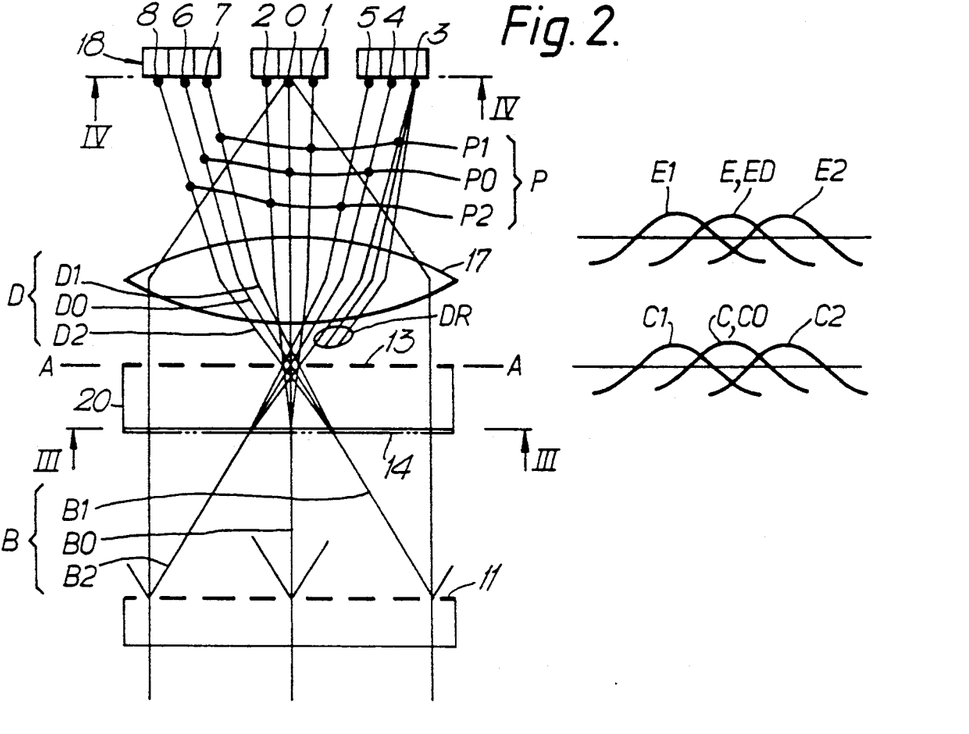
FIG. 2 shows a part of FIG. 1 to an enlarged scale.

A decollimating lens 17 is arranged to focus the nine modulated secondary orders D to respective nine foci or light signals 0–8. In other words, each secondary order comprises a group of rays, e.g. DR, having the same direction and which converge on to the same one, e.g. 4, of the foci 0–8. In other words, the lens 17 collects like orders D at the respective foci 0–8. It will be clear that each focus 0–8 receives light from the whole of the region covered by the lens 17, i.e. from the whole of the region of the scale seen by the lens.

Figure 4:
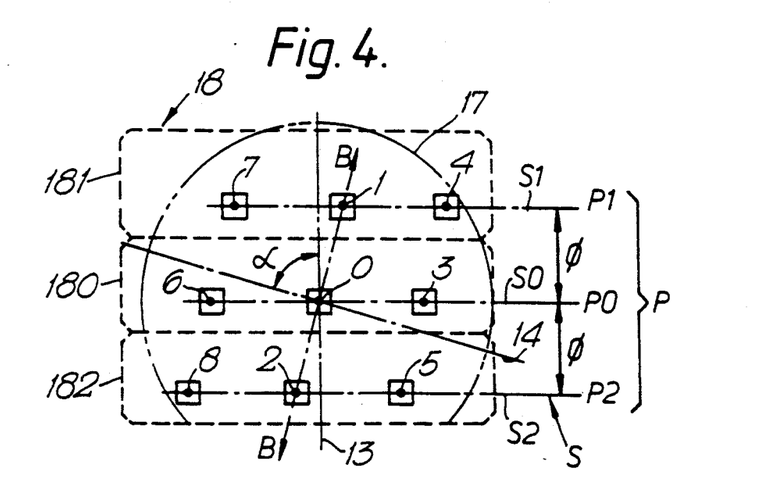
FIG. 4 is a view on the line IV—IV in FIG. 2.

As shown in FIG. 4 the foci of those secondary orders which have the same phase are provided with a respective transducer of the system 18. Thus there are three transducers 180, 181, 182 having respective output signals S0, S1, S2, collectively denoted S, corresponding to the respective phases P0, P1, P2. In the particular case of the gratings 11, 12, 13, 14 being Ronchi gratings, the inner signals 0, 1, 2 of the respective phases P0, P1, P2 are not modulated. However, such modulation does occur if phase gratings are used. This is described later herein.

The gratings 13, 14 are provided at opposite sides of a glass plate 20 (FIG. 2, 3) but, whereas the gratings 11, 12, 13 define spaced lines 11A, 12A, 13A respectively, all extending in the direction Y, the grating 14 defines spaced line 14A extending at an angle $\alpha$ to those of the other gratings thereby effecting the separation of the phases P0, P1, P2. The diffracting effect of the grating 14 at the angle $\alpha$ creates the fringes C1, C2 at opposite sides of the fringes C0 along a line B—B normal to the lines of the grating 14. The components C1x, C2x of this displacement in the direction normal to the lines of the grating 13 constitutes the separation of the phases P0, P1, P2.

The thickness of the plate 20 defines the separation G of the gratings 13, 14 and is related to the angle $\alpha$ in accordance with the expression:

$$\tan \alpha = \Delta G/(G \times \Delta \alpha) \quad (1)$$

where $\Delta G$ and $\Delta \alpha$ are given manufacturing tolerances and the angle $\alpha$ is the optimum angle for minimum phase error. For example, for a thickness G of 1 mm having a tolerance $\Delta G$ of 0.05 mm, and a tolerance $\Delta \alpha$ of 0.1°, the angle $\alpha$ is approximately 88°. This produces a good separation of the foci 0 to 8 as shown in FIG. 4. Minor adjustments of the angle $\alpha$ or the thickness G may be made to achieve a given phase separation $\phi$.

The separation $\phi$ is expressed (in radians) by:

$$\phi = (2\pi G\lambda \cos \alpha)/(D3 \times D4) \quad (2)$$

wherein:
$\lambda$ = wave length of light
D3 = pitch of grating 13
D4 = pitch of grating 14

While the gratings 11, 12, 13 may be Ronchi gratings, the grating 14 may be a phase grating because of the importance of concentrating light equally between the secondary different diffraction orders. This can more easily be achieved with a phase grating by appropriate dimensioning of its profile.

The output signals S of the transducers 18 (FIG. 1) vary sinusoidally and have a phase difference which in this case is 120°. The signals S are connected to a quadrature circuit 20 being a circuit, known per se, for processing such signals with a view to obtaining an accurate sine signal 20A each cycle of which represents a relative displacement between the readhead 19 and the grating 11 by one pitch thereof or an integer multiple of that pitch. The circuit 20 also produces a cosine signal 20B corresponding to the sine signal 20A and required for determining the direction of said displacement. An example of a circuit such as the circuit 20 is shown in our International Patent Publication No. WO 87/07943.

In the present example the grating 11 is transmissive and the gratings are arranged for the light to interact in succession with the gratings 12, 11, 14 and 13. That is, the grating generating the periodic light pattern is first; the grating defining the scale is second and, in this case, also generates the primary diffraction orders; the grating generating the secondary order is third; and the grating generating the light modulation is last. In this arrangement, and with the first grating 11 being equidistant between the second and third gratings, there is obtained an "optical lever" effect whereby the rate of displacement of the fringes relative to the grating 13 is twice that of the readhead 19 relative to the grating 11 with the advantage that two signals S are obtained for every reading of one pitch of the grating 11.

Referring to the three phases P0, P1, P2 (FIG. 4), as mentioned, with the use of Ronchi gratings the inner signals 0, 1, 2 are not modulated, i.e. they merely define a relatively steady light level. In a modification, all the gratings 11, 12, 13, 14 are phase gratings whereby the inner signals 0, 1, 2 also become modulated. Such modulation may occur in antiphase with the outer signals 3,6; 4,7; and 4,8 respectively if the mark-space ratio of the phase gratings is 1:1. In that case, arrangement is made, in each phase, to sum the outer two signals, e.g. 5,8, and combine them in push-pull order with the inner signal, e.g. 2, whereby a good sine wave, without a DC component, is obtainable. Alternatively, the intermediate phase P0 is eliminated by suitable dimensioning of the profile of the grating 14. These modifications result in improved efficiency.

Figure 5:
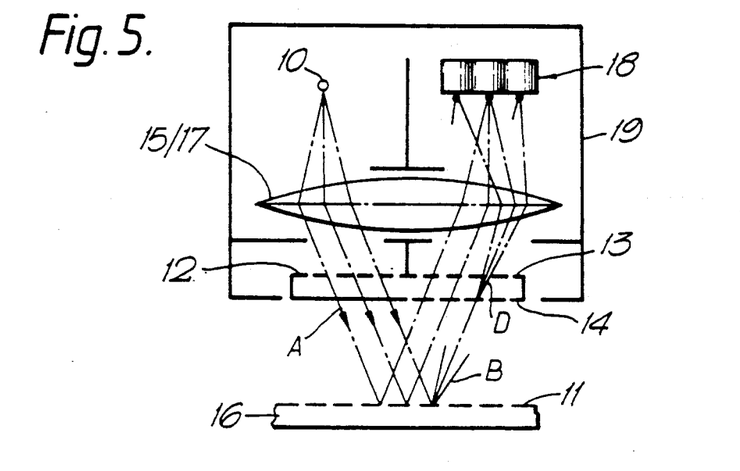
FIG. 5 is an elevation of a second example of the apparatus.

The second example, shown in FIG. 5, is equivalent to that shown in FIG. 1 in that the gratings are arranged for the light to interact in succession with the gratings 12, 11, 14 and 13. In other respects, the example of FIG. 5 differs as follows. The gratings 12, 14, 13 are provided on a single plate of glass as shown and a single lens 15/17 is arranged for one half thereof to collimate the light from the source 10 and for the other half thereof to decollimate the secondary orders and distribute the respective phases on to the transducers 18.

Figure 6:
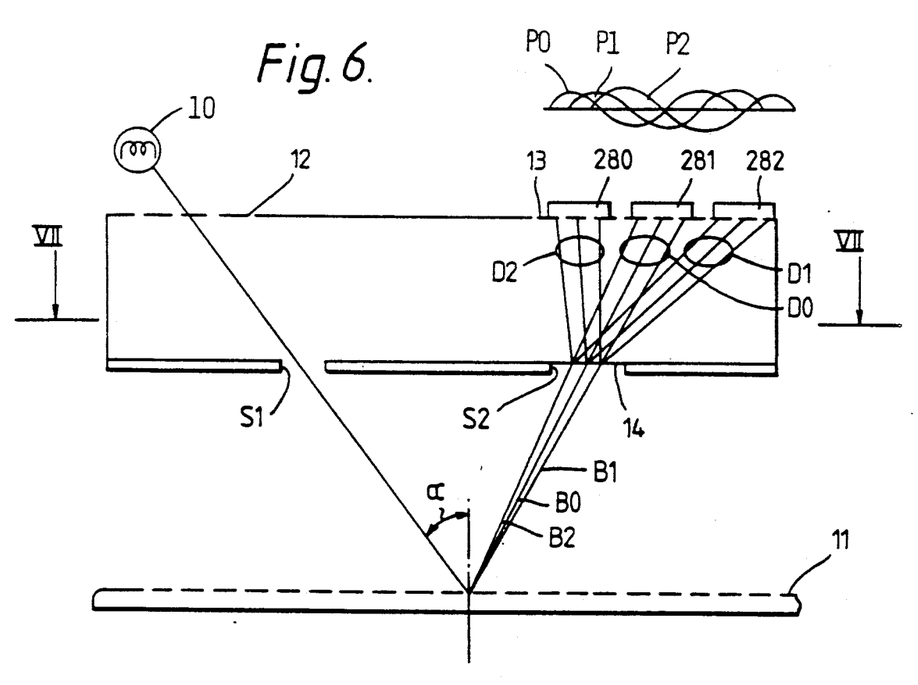
FIG. 6 is an elevation of a third example of the apparatus.
Figure 7:
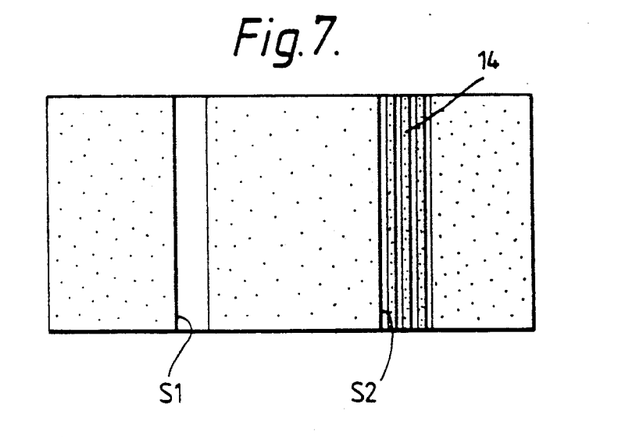
FIG. 7 is a view on VII—VII in FIG. 6.

The third example is shown in FIGS. 6 and 7 and is a modification of the example shown in FIG. 5. In the third example, it is possible to eliminate the use of the lens 15/17 by providing a pair of apertures S1 and S2 extending parallel to the direction of the lines of the gratings 11 to 13. Thus, in the third example, light passes from the source 10 through the second grating 12, aperture S1, is reflected off the first grating (which in this example is the scale) 11 at an angle $\alpha$ to the normal, passes through the aperture S2, and is incident upon the third grating at 13. A fourth grating at 14 is provided in the aperture S2. Light reflected from the scale 11 is split into a set of primary orders B0, B1 and B2 which is divided by the fourth grating 14 into three sets of primary orders, each corresponding to a secondary order; thus there are three secondary orders D0, D1 and D2 spaced from each other perpendicularly to the lines on grating 13. The positions of incidence of the three secondary orders D0, D1, D2 are adjusted (by adjusting inter alia the alignment of the apparatus) until the light modulations corresponding to each of the orders D0, D1, D2 are generated in three phases P0, P1 and P2. The apertures S1 and S2 restrict the amount of light passing from the source 10 through to the third grating 13, and thus enable three spatially distinct phases P0, P1 and P2 to be generated in the plane of the grating 13. The intensity of each light modulation is detected by a light sensitive transducer array 280, 281 and 282 respectively. Any means for splitting the set of primary orders may be used, e.g. a prism.

Figure 8:
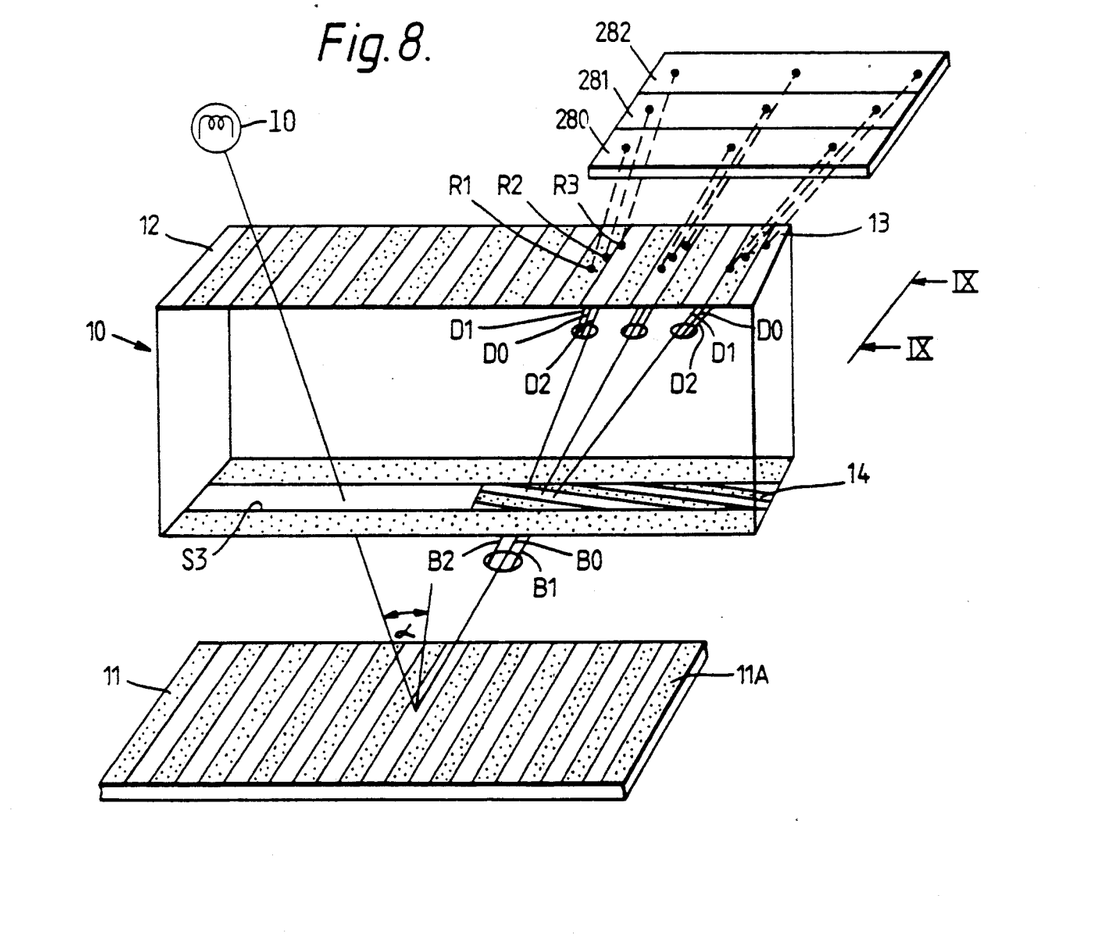
FIG. 8 is a perspective view of a fourth example of the apparatus.
Figure 9:
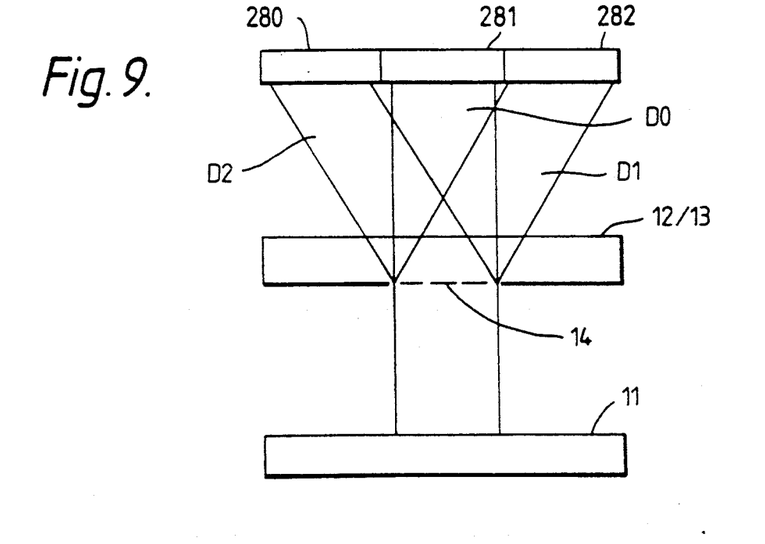
FIG. 9 is a view on IX—IX in FIG. 8.

A fourth example of the present invention is a modification of the third example and is shown in FIGS. 8 and 9. As with the third embodiment light is from a source 10 passes through a secondary grating 12, is incident upon a first grating 11 (provided by a scale), and is reflected from the scale to provide, upon relative movement of the readhead and the scale light modulations of the third grating 13. In this embodiment a single aperture S3 extending longitudinally with respect to the direction of the scale is provided. The side of the aperture (which transmits light incident on the first grating 11) in register with the second grating 12 is clear, while a fourth grating 14 is provided in the side of the aperture S3 through which light reflected from the first grating passes. The lines of the fourth grating extend substantially perpendicular to the lines of the scale 11 but are skewed from the perpendicular by approximately one degree. As with the previous embodiments, light reflected from the scale 11 is divided into a set of three primary orders B0, B1, and B2, which is divided into three such sets upon passing through the fourth grating 14. Thus as with the previous embodiments there are three sets of primary orders each one corresponding to a set of secondary orders D0, D1, D2 each containing light from each of the primary orders. Each secondary order D0, D1, D2 has its own unique phase P0, P1, and P2 by virtue of the offset of the fourth grating 14 from the perpendicular; this gives rise to three strip like interference fringe patterns (each produced by a set of interfering primary orders) which are mutually offset in the direction of the lines of the third grating 13, and which are represented schematically by the points of intersection R1, R2, R3. In this embodiment however the three phases P0, P1 and P2 are not spatially distinct at the third grating 13. Separation of the three phases is achieved by increasing the distance between the light sensitive transducers 280, 281, and 282 and the third grating 13. This is illustrated in FIG. 9.

Figure 10:
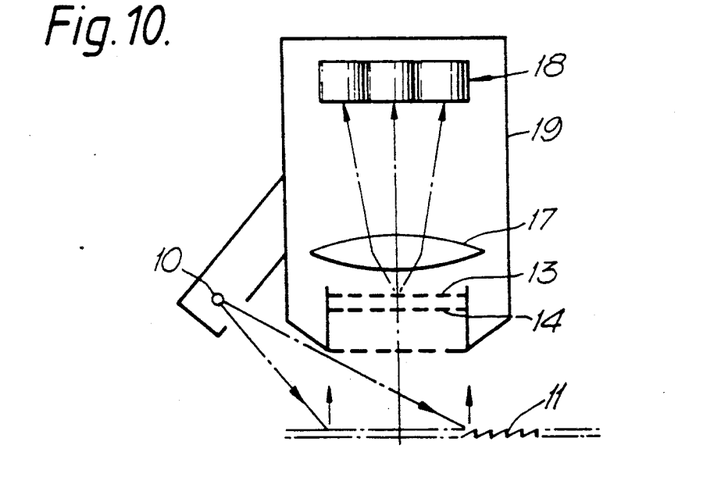
FIG. 10 is an elevation of a fifth example of the apparatus.
Figure 11:
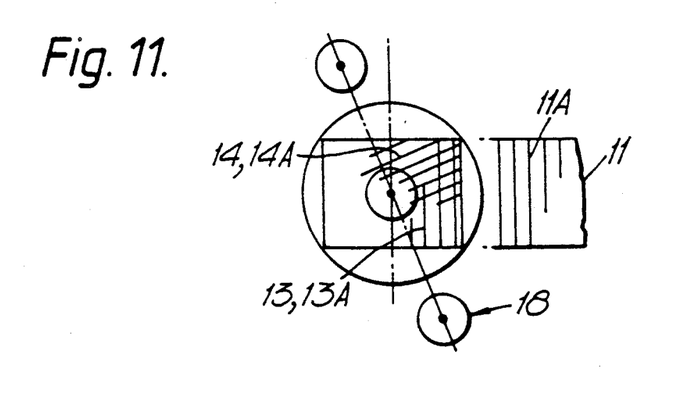
FIG. 11 is a plan view of FIG. 10.

One of the consequences of the grating 14 having lines extending longitudinally with respect to the scale is that the phases P1 and P2 are each offset in the same direction with respect to the phase P0 by some amount $\Delta$. This offset results in the Lisajous figure corresponding to the output 20A and 20B of the quadrature circuit becoming elliptical (as opposed to circular for perfect quadrature outputs 20A and 20B). An elliptical Lisajous figure is undesirable since interpolation of the quadrature outputs becomes inaccurate, and the apparatus is much more susceptible to misalignment of the readhead and the scale. Thus to compensate for this phase offset certain design parameters (for example the angle of the lines of the fourth grating 14, the thickness of the glass block, and the angle at which the light incident is from the second grating 12 onto the first grating 11) must be changed. The following parameters have been found to provide suitable quadrature outputs (with a skewing of the lines on the fourth grating by 41 minutes):

plate thickness 0.95 mm; angle $\gamma = 30°$
plate thickness 2.61 mm; angle $\gamma = 23°$
plate thickness 3.00 mm; angle $\gamma = 11°$ The fifth example, shown in FIGS. 10 and 11, differs from the earlier examples in that the gratings are arranged for the light to interact in succession with the gratings 11, 12, 14 and 13 so that the above mentioned optical lever effect is not obtained. Also, in the present example, the grating 11 is reflective and is a blazed grating profiled to reflect the light from the source 10 into the readhead 19. The lens 17, which covers the whole of the aperture of the readhead, distributes the respective phases on to the transducers 18.

Figure 12:
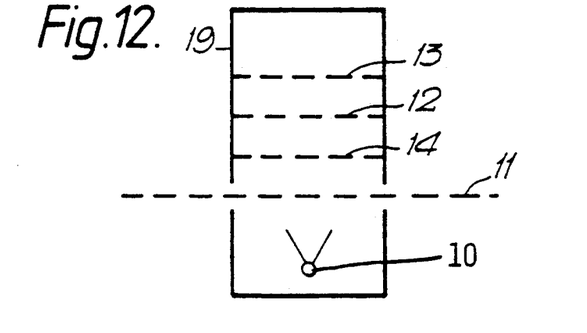
FIG. 12 is a schematic view of a sixth example.

In the sixth example, shown in FIG. 12, the gratings are arranged for the light to interact in succession with the gratings 11, 14, 12, and 13.

Figure 13:
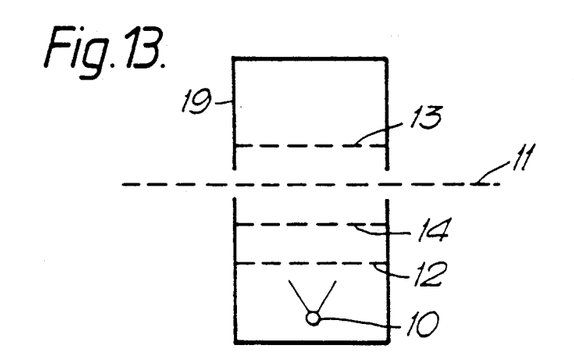
FIG. 13 is a schematic view of a seventh example.

In the seventh example shown in FIG. 13 the gratings are arranged for the light to interact in succession with the gratings 12, 14, 11 and 13.

Where the order of the first, second and third gratings is 12, 11, 13, the grating 14 may be situated anywhere in the light path between the gratings 12,13 but it is advantageous for the grating 14 to be situated close to the one or the another of the gratings 12,13 because then the gratings 12,14 or 13,14, as the case may be can be provided at opposite sides of the same glass plate. Also, if the gratings 12,14 or 13,14 are relatively close together, a relatively large angle $\alpha$ is obtainable as will be seen from expression (1) above.

When the grating 14 is situated upbeam of the scale 11, the secondary orders are generated before the primary orders (which in this arrangement are generated at the scale), because the grating 14 is close to the scale light and is still incident upon a substantially common region of the scale at a substantially common angle and some of the benefits of common mode rejection are accrued. It is nonetheless preferable to generate the secondary orders after the light is incident upon the scale.

Where the order of the gratings is 11, 12, 13 (e.g. FIG. 10) the grating 14 may be situated anywhere between the scale 11 and the analyser grating 13. Thus in this case total common mode rejection is obtained regardless of whether the secondary orders are generated before the primary orders (when grating 14 lies between scale 11 and grating 12) or after (when grating 14 lies between grating 12 and grating 13).

Figure 14:
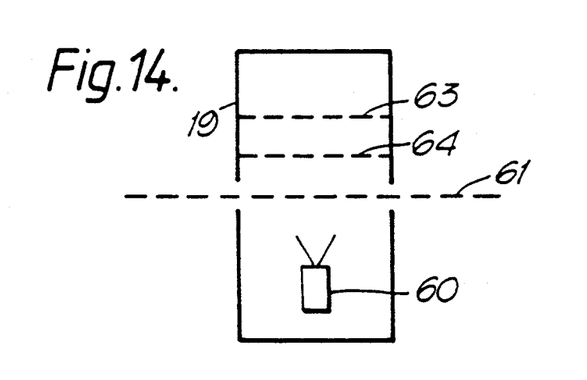
FIG. 14 is a schematic view of an eighth example.
Figure 15:
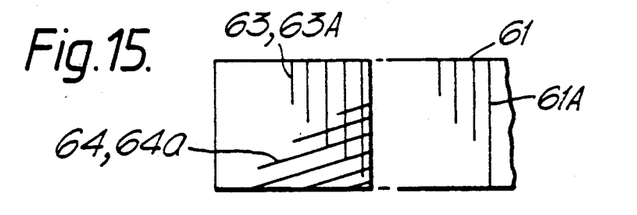
FIG. 15 is a plan view of FIG. 14.

In the eighth example, shown in FIGS. 14 and 15, the light used is coherent such as from a laser 60. In this case the basic apparatus requires only two gratings, that is a grating 61 defining the scale and a grating 63 for generating the light modulation. One of the gratings 61 or 63, when illuminated by the laser 60, will produce the primary interference fringes in the plane of the other grating, 63 or 61. The lines of the gratings 61, 63 have the same direction. The grating for generating the phase separation, here denoted 64, constitutes a third grating arranged between the gratings 61, 63 and having lines lying at angle to those of the gratings 61, 63 substantially as described with reference to the gratings 14, 13 of FIGS. 1 to 4.

We claim:

1. Opto-electronic scale reading apparatus comprising:
   first grating means defining a scale;
   a read head, said read head being displaceable relative to the scale,
   second and third grating means provided on the read head, said first, second and third grating means each having a periodic structure defined by spaced lines;

a light source provided on the read head for illuminating one of said first and second grating means, the other of said first and second grating means interacting with light transmitted through said one of said first and second grating means for generating a periodic light pattern in the plane of the third grating means, said periodic light pattern having movement relative to said third grating means in accordance with said displacement thereby generating a corresponding light modulation; and phase-separating means for separating said modulation into a plurality of phases comprising fourth grating means positioned between said third and said one of the first and second grating means for generating a plurality of said periodic light patterns, said periodic light patterns cooperating with said third grating means to generate a plurality of said light modulations having a phase-shifted relationship.

2. Apparatus according to claim 1 wherein the respective lines of the first, second and third grating means extend in a common direction, and the fourth grating means is defined by lines extending at an angle $\alpha$ to the common direction.

3. Apparatus according to claim 2 wherein the fourth grating means is situated between the second and third grating means.

4. Apparatus according to claim 2 wherein the fourth grating means is situated between the first and second grating means.

5. Apparatus according to claim 2 wherein the fourth grating means comprises a phase grating.

6. Apparatus according to claim 2 wherein said angle is $$\tan \alpha = \Delta G/(G \times \Delta \alpha)$$

wherein $\alpha$ = said angle,

G = the distance between the fourth grating means and the one of the first, second and third grating means nearest thereto.

$\Delta \alpha$ = a manufacturing tolerance for the angle $\alpha$.

$\Delta G$ = a manufacturing tolerance for the distance G.

7. Apparatus according to claim 2 wherein said angle is less than 90 degrees.

8. Apparatus according to claim 1 wherein the respective lines of the first, second and third grating means extend in a common direction, and the fourth grating means is defined by lines extending parallel to the common direction.

9. Apparatus according to claim 1 wherein said first and second grating means, and said fourth grating means co-operate for generating a set of primary diffraction orders and for generating from each of said primary orders a set of secondary diffraction orders; and the apparatus comprises means for collecting like orders of said sets of secondary orders, and means for detecting said collected like orders.

10. Apparatus according to claim 1 wherein said grating means are arranged for the light from said source to pass in succession through said second, first, fourth and third grating means.

11. Apparatus according to claim 10 wherein said second and first grating means co-operate for generating a set of primary diffraction orders and said fourth grating means is positioned for generating from each of said primary orders a set of secondary diffraction orders; and wherein the apparatus further comprises collecting means for collecting those secondary orders of each of the respective sets of secondary orders which have the same direction, and means for detecting respective collected said orders.

12. Apparatus according to claim 11 wherein said collecting means comprise a decollimating lens means for focusing said secondary orders having the same direction into a respective common focus.

13. Apparatus according to claim 12 comprising transducer means for detecting the respective said foci.

14. Apparatus according to claim 1 wherein said grating means are arranged for the light from said source to pass in succession through said first, second, fourth and third grating means.

15. Apparatus according to claim 14 wherein said first and second grating means co-operate for generating a set of primary diffraction orders, and said fourth grating means is positioned for generating from each of said primary orders a set of secondary diffraction orders; and wherein the apparatus further comprises collecting means for collecting those orders of each of the respective sets of secondary orders which have the same direction, and means for detecting respective collected said orders.

16. Apparatus according to claim 15 wherein said collecting means comprise a decollimating lens means for focusing said secondary orders having the same direction into a respective common focus.

17. Apparatus according to claim 1 wherein said grating means are arranged for the light from said source to pass in succession through said first, fourth, second and third grating means.

18. Apparatus according to claim 17 wherein said first and fourth grating means co-operate for generating a set of primary diffraction orders, and said second grating means is positioned for generating from each of said primary orders a set of second diffraction orders; and wherein the apparatus further comprises collecting means for collecting those orders of each of the respective sets of secondary orders which have the same direction, and means for detecting respective collected said orders.

19. Apparatus according to claim 18 wherein said collecting means comprise a decollimating lens means for focussing said secondary orders having the same direction into a respective common focus.

20. Apparatus according to claim 1 wherein said grating means are arranged for the light from said source to pass in succession through said second, fourth, first and third grating means.

21. Apparatus according to claim 20 wherein said second and fourth grating means co-operate for generating a set of primary diffraction orders, and said first grating means is positioned for generating from each of said primary orders a set of secondary diffraction orders; and wherein the apparatus further comprises collecting means for collecting those orders of each of the respective sets of secondary orders which have the same direction, and means for detecting respective collected said orders.

22. Apparatus according to claim 21 wherein said collecting means comprise a decollimating lens means for focussing said secondary orders having the same direction into a respective common focus.

23. Opto-electronic scale-reading apparatus comprising:

first grating means defining a scale;

a read head, said read head being displaceable relative to the scale;

second grating means provided on the read head, said first and second grating means each having a periodic structure defined by spaced lines;

a source of coherent light provided on the read head for illuminating one of said first and second grating means for generating interference fringes in the plane of the other one of said first and second grating means, said interference fringes having movement relative to said other one of said first and second grating means in accordance with said displacement thereby to generate a corresponding light modulation and;

phase-separating means for separating said modulation into a plurality of phases comprising third grating means positioned between said first and second grating means and lying in a plane parallel to the plane of one of said first and second grating means, the respective lines of said first and second grating means lying in a common direction, and said third grating means being defined by lines lying at an angle to said common direction thereby effecting said phase separation.

24. Opto-electric scale-reading apparatus according to claim 23 wherein said light source and said one of the first and second grating means co-operate for forming a set of primary diffraction orders, said third grating means generates from each of said primary orders a set of secondary diffraction orders; and the apparatus comprises means for collecting like orders of each of said sets of secondary orders, and means for detecting said collected like orders.

25. Opto-electronic scale-reading apparatus according to claim 24 wherein said collecting means comprises a decollimating leans means for focussing said secondary orders having the same direction into a respective common focus.

26. Opto-electronic scale-reading apparatus according to claim 25 comprising transducer means for detecting the respective said foci.

27. Opto-electronic scale-reading apparatus comprising a scale and a readhead, the readhead having a single analyser grating;

illuminating means for illuminating the scale with a beam of light and for generating a periodic light pattern in the plane of said single analyser grating, and a light modulation upon relative movement of the scale and the readhead; and splitting means for generating a plurality of said periodic light patterns thereby providing at said single analyser grating a plurality of said light modulations in a phase-shifted relationship.

28. An apparatus according to claim 27 wherein said splitting means is provided by an auxiliary grating.

29. An apparatus according to claim 28 wherein the illuminating means comprises a beam of non-coherent light and an index grating.

30. An apparatus according to claim 28 wherein said illuminating means comprises means for generating a set of primary diffraction orders thereby generating interference fringes in the plane of the analyser grating, and the auxiliary grating generates second diffraction orders.

31. An apparatus according to claim 30 wherein the illuminating means comprises a beam of coherent light incident directly upon the scale.

32. An apparatus according to claim 30 wherein the illuminating means comprises a beam of non-coherent light and an index grating, and wherein the index grating is provided in the beam path upbeam of the scale, and the primary diffraction orders are generated by the scale.

33. An apparatus according to claim 30 wherein the illuminating means comprises a beam of non-coherent light and an index grating, and wherein the index grating is provided in the beam path upbeam of the scale, and the primary diffraction orders are generated by the index grating.

34. An apparatus according to claim 31 wherein the auxiliary grating is provided in the beam path upbeam of the scale, thereby to illuminate the scale with said secondary orders, the scale generating in respect of each said secondary order a set of primary orders.

35. An apparatus according to claim 31 wherein the auxiliary grating is provided in the beam path down beam of the scale, thereby to split said primary orders of diffraction formed at said scale into said plurality of sets, and each one of said plurality of sets corresponding to a said secondary order of diffraction.

36. An apparatus according to claim 32 wherein the auxiliary grating is provided in the beam path between the index grating and the scale, thereby to illuminate the scale with said secondary orders, the scale generating in respect of each said secondary order a primary order.

37. An apparatus according to claim 32 wherein the auxiliary grating is provided in the beam path downbeam of the scale thereby to split said primary orders of diffraction into said plurality of sets and each one of said plurality of sets corresponding to a said secondary order of diffraction.

38. An apparatus according to claim 33 wherein the auxiliary grating is provided in the beam path between the scale and the index grating, thereby to illuminate the index grating with said secondary orders, the index grating generating in respect of each said secondary order a set of primary orders.

39. An apparatus according to claim 33 wherein the auxiliary grating is provided in the beam path downbeam of the index grating thereby to split said primary orders of diffraction into said plurality of sets, and each one of said plurality of sets corresponding to a said secondary order of diffraction.

40. An apparatus according to claim 32 wherein the index grating, analyser grating and auxiliary grating each have a periodic structure defined by spaced lines, and the index grating and analyser grating are provided adjacent each other on one side of a single glass plate.

41. An apparatus according to claim 40 wherein the auxiliary grating is provided on another side of the glass plate and in register with the index grating.

42. An apparatus according to claim 40 wherein the auxiliary grating is provided on another side of the glass plate and in register with the analyser grating.

43. An apparatus according to claim 42 wherein light is incident upon the scale via an aperture provided on said another side of said plate and in register with the index grating, and is incident upon the analyser via an aperture provided on said another side of said plate and in register with the analyser grating.

44. An apparatus according to claim 43 wherein the lines of the auxiliary grating extend parallel to the lines of the analyser grating thereby to split said primary orders of diffraction into said plurality of sets, in a direction perpendicular to the lines of the analyser grating.

45. An apparatus according to claim 42 having a single aperture extending perpendicular to the direction of the lines of the index and analyser gratings and wherein the lines of the auxiliary grating extend at an angle less than 90° to the lines of the index and analyser gratings.

46. An apparatus according to claim 44 further comprising a transducer for detecting the light modulation corresponding to each one of said plurality of sets of primary orders.

47. An apparatus according to claim 45 further comprising a transducer for detecting the light modulation corresponding to each one of said plurality of sets of primary orders.

48. Opto-electronic apparatus for measuring relative displacement of two members moveable relative to each other in a measuring direction, the apparatus comprising:

first, second and third grating means each defined by a series of spaced apart parallel lines extending substantially perpendicular to said measuring direction;

a light source positioned to sequentially illuminate said first, second and third grating means thereby generating a periodic light pattern in the plane of the third grating means, one of said first, second and third grating means being provided by a scale connected to one of said members, and the others of said first, second, and third grating means being provided in a readhead connected to the other of the members; and splitting means provided upbeam of the third grating means for splitting said periodic light pattern into a plurality of periodic light patterns, each periodic light pattern of said plurality of light patterns being offset from each other periodic light pattern of said plurality in a direction perpendicular to the lines of said third grating means.

49. Apparatus according to claim 48 wherein said splitting means additionally offsets each periodic light pattern of said plurality in a direction parallel to the lines of the third grating means.

50. Apparatus according to claim 49 wherein said second grating means is provided by said scale, and said splitting means is provided by an auxiliary grating positioned downbeam of said scale.

51. Apparatus according to claim 50 wherein the lines of the auxiliary grating extend at a non-perpendicular angle to the lines of the third grating means.

52. Apparatus according to claim 50 wherein said first and third grating means are each provided by a single grating, both said single gratings being provided adjacent each other on one side of a single glass plate, and wherein said auxiliary grating is provided in register with said third grating means on another side of said glass plate.

53. Apparatus according to claim 52 having an aperture on said another side of said glass plate extending perpendicular to the lines of said third grating means, and wherein said auxiliary grating is provided in said aperture.

* * * * *